(12) United States Patent
Ni et al.

(10) Patent No.: US 12,174,461 B2
(45) Date of Patent: Dec. 24, 2024

(54) SUSTAINED RELEASE OF OLEIC ACID FROM CONTACT LENSES

(71) Applicant: CooperVision International Limited, Fareham (GB)

(72) Inventors: Jing Ni, Pleasanton, CA (US); Ronghua Liu, Livermore, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/707,607

(22) PCT Filed: Sep. 25, 2023

(86) PCT No.: PCT/GB2023/052477
§ 371 (c)(1),
(2) Date: May 6, 2024

(87) PCT Pub. No.: WO2024/069147
PCT Pub. Date: Apr. 4, 2024

(65) Prior Publication Data
US 2024/0337864 A1 Oct. 10, 2024

Related U.S. Application Data

(60) Provisional application No. 63/410,240, filed on Sep. 27, 2022.

(51) Int. Cl.
*G02C 7/04* (2006.01)
*G02B 1/04* (2006.01)
(52) U.S. Cl.
CPC ............... *G02C 7/04* (2013.01); *G02B 1/043* (2013.01)

(58) Field of Classification Search
CPC .................................. G02C 7/04; G02B 1/043
(Continued)

(56) References Cited

U.S. PATENT DOCUMENTS 5,942,558 A * 8/1999 Korb .................. G02B 1/043
524/916
6,867,245 B2 3/2005 Iwata et al.
(Continued)

FOREIGN PATENT DOCUMENTS

TW 202235253 A 9/2022
WO 2011098578 A2 8/2011

OTHER PUBLICATIONS

International Search Report and Written Opinion issued in corresponding International Patent Application No. PCT/GB2023/052477 dated Feb. 2, 2024 (11 pages).
(Continued)

*Primary Examiner* — William R Alexander
(74) *Attorney, Agent, or Firm* — Kilyk & Bowersox, P.L.L.C.

(57) ABSTRACT

An oleic acid-releasing contact lens is described as well as method of manufacturing the same. The oleic acid-releasing contact lens comprises a glycerophospholipid comprising an oleoyl group at the sn-2 position and sustains the release of oleic acid in the presence of $sPLA_2$ enzyme present in human tears. The oleic acid-releasing contact lens can increase the duration of comfortable lens wearing time and/or reduce lens awareness events in a symptomatic contact lens wearer.

13 Claims, 1 Drawing Sheet

(58) Field of Classification Search
USPC .................................................. 351/159.04
See application file for complete search history.

(56) References Cited

U.S. PATENT DOCUMENTS

| | | | | |
|---|---|---|---|---|
| 7,115,667 | B2* | 10/2006 | Sly | A61P 27/04 514/786 |
| 7,426,993 | B2 | 9/2008 | Coldrey et al. | |
| 8,231,218 | B2 | 7/2012 | Hong et al. | |
| 8,658,747 | B2 | 2/2014 | Liu et al. | |
| 8,865,789 | B2 | 10/2014 | Yao et al. | |
| 10,155,349 | B2* | 12/2018 | Pruitt | G02B 1/043 |
| 2008/0124376 | A1* | 5/2008 | Pruitt | A61K 31/35 514/324 |
| 2008/0287395 | A1 | 11/2008 | Ghosh et al. | |
| 2009/0160074 | A1* | 6/2009 | Pruitt | G02B 1/043 264/1.36 |
| 2010/0140114 | A1* | 6/2010 | Pruitt | G02B 1/043 53/425 |
| 2019/0070804 | A1* | 3/2019 | Pruitt | G02B 1/043 |
| 2021/0129467 | A1* | 5/2021 | Pruitt | B29D 11/00067 |
| 2022/0047502 | A1 | 2/2022 | Cheng et al. | |
| 2022/0047503 | A1 | 2/2022 | Ge et al. | |
| 2022/0183433 | A1 | 6/2022 | Ji et al. | |
| 2022/0187620 | A1 | 6/2022 | Si et al. | |
| 2024/0118559 | A1* | 4/2024 | Ni | G02C 7/04 |
| 2024/0126101 | A1* | 4/2024 | Ni | G02C 7/04 |

OTHER PUBLICATIONS

Chalmers et al., "Contact Lens Dry Eye Questionnaire-8 (CLDEQ-8) and Opinion of Contact Lens Performance," Optometry and Vision Science, Oct. 2012, vol. 89, No. 10, pp. 1435-1442.

Read et al., "Monitoring ocular discomfort using a wrist-mounted electronic logger," Contact Lens and Anterior Eye, (Feb. 2020) https://doi.org/10.1016/j.clae.2020.02.010.

Office Action issued in corresponding Chinese Patent Application No. 202380014967.2 dated Sep. 26, 2024 (with English translation)(13 pages).

Office Action issued in corresponding Mexican Patent Application No. MX/a/2024/006353 dated Sep. 18, 2024 (5 pages).

* cited by examiner

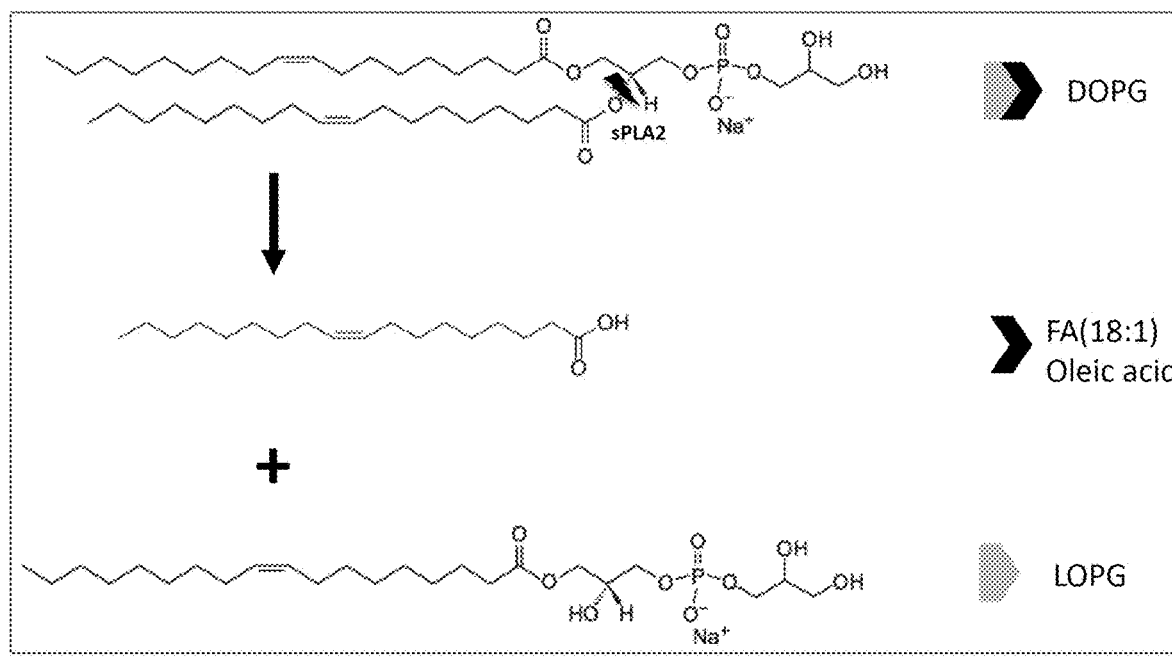

SUSTAINED RELEASE OF OLEIC ACID FROM CONTACT LENSES

This application is a National Stage Application of PCT/GB2023/052477, filed Sep. 25, 2023, which claims priority to U.S. Patent Application No. 63/410,240, filed Sep. 27, 2022.

FIELD OF THE INVENTION

The field of the invention relates to contact lenses, and particularly, to contact lenses that are more comfortable for contact lens wearers.

BACKGROUND OF THE INVENTION

An estimated 50% of all contact lens wearers experience discomfort while wearing their lenses, and approximately 25% of these contact lens wearers permanently discontinue wearing lenses. Sensations of lens awareness is a primary reason for contact lens dissatisfaction in contact lens wearers. Despite advances in contact lens materials, there remains a need for improved contact lenses that can be comfortably worn by contact lens wearers who otherwise experience sensations of lens awareness while wearing contact lenses that are currently commercially available.

Fatty acids are known to act as comfort agents that when administered to the eye can provide lubrication alleviate discomfort. Fatty acids that act as comfort agents can be released from a contact lens during wear in amounts sufficient to de-sensitize the eye and therefore reduce discomfort (US Pat. Appln. Publ. No 20220187620). However, some contact lens materials cannot sustain fatty acid release for an entire day.

It is desirable to obtain a sustained fatty acid release rate from a contact lens, thereby enhancing the comfort of contact lens wear in contact lens wearers and increasing the duration of time in which a contact lens wearer can comfortably wear contact lenses. Alternatively, or additionally, it is desired to provide an improved contact lens that can be worn by a contact lens wearer.

SUMMARY OF THE INVENTION

A feature of the present invention is to provide a hydrogel contact lens that can release oleic acid and salts thereof during lens wearing. The term "oleic acid" has used herein refers both to oleic acid in the form of the free acid and as salts.

An additional feature of the present invention is to provide a contact lens that can be comfortably worn by a contact lens wearer.

An additional feature of the present invention is to increase the duration of comfortable lens wearing time and/or reduce lens awareness events in a contact lens wearer.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part relates to a hydrogel contact lens comprising a polymeric lens body loaded with 2-oleoyl phospholipid. The 2-oleoyl phospholipid is advantageously susceptible to digestion by secretory phospholipase 2-acylhydrolase ($sPLA_2$) enzymes found in human tears, especially group IIA secretory phospholipase 2-acylhydrolase ($sPLA_2$-IIA). The 2-oleoyl phospholipid present in the contact lens body is advantageously susceptible to digestion by $sPLA_2$ enzymes found in human tears, especially $sPLA_2$-IIA when the 2-oleoyl phospholipid is present in the polymeric lens body of a silicone hydrogel contact lens, such as a stenfilcon A contact lens. A 2-oleoyl phospholipid may be considered to be susceptible to digestion by $sPLA_2$ enzymes when the amount of oleic acid that is released from a stenfilcon A lens loaded with least 200 μg of the 2-oleoyl phospholipid to a release medium containing $sPLA_2$ enzyme, is at least twice, for example at least three times, the amount of oleic acid released to an otherwise identical control release medium lacking phospholipase $A_2$ enzymes, following immersion of identical stenfilcon A contact lenses each loaded with said 2-oleoyl phospholipid in each release media for 4 hours at 35° C. The release medium containing $sPLA_2$ enzyme may be an artificial tear fluid (ATF), such as that defined in Table 1 below, additionally containing 50 ppm recombinant human $sPLA_2$-IIA and the control release medium lacking phospholipase $A_2$ enzymes may be an otherwise identical ATF release medium lacking phospholipase $A_2$ enzymes. Alternatively, the release medium containing $sPLA_2$ enzyme may be reflex tear solution and the control release medium may be an ATF. For the avoidance of doubt, while the determination of whether a 2-oleoyl phospholipid is susceptible to digestion by $sPLA_2$ enzymes may be carried out by loading the 2-oleoyl phospholipid to a stenfilcon A lens, the contact lens of the invention, including contact lenses comprising 2-oleoyl phospholipid that have been determined to be susceptible to digestion by $sPLA_2$ enzymes, need not be stenfilcon A lenses and may be silicone hydrogel lenses of any formulation. In all aspects of the invention the contact lens into which a 2-oleoyl phospholipid that is susceptible to digestion by $sPLA_2$ enzymes may be any contact lens described herein. For comparison, an example of a phospholipid that has been found to not be susceptible to digestion by $sPLA_2$ enzymes found in human tears when present in a silicone hydrogel contact lens body is dimyristoyl phosphatidylcholine, i.e., 1,2-dimyristoyl-sn-glycero-3-phosphocholine (DMPC). The phospholipid may be an anionic glycerophospholipid or zwitterionic glycerophospholipid. An anionic glycerophospholipid includes an anionic (negatively charged) substrate group attached to the phospholipid head group (i.e., at the $R^3$ position in Formula (I) below). The 2-oleoyl phospholipid may be of the Formula (I):

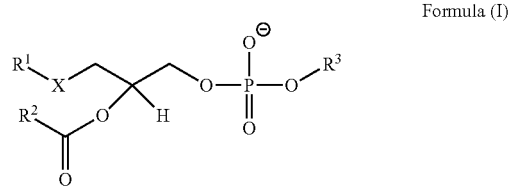

Formula (I)

in which X is either —O— or —O(CO)—, $R^1$ is $C_{11-25}$ alkyl, $R^2$ is $CH_3(CH_2)_7CH=CH(CH_2)_7$—, $R^3$ is selected from hydrogen; $C_{1-10}$ polyol (such as glycerol or inositol); ethanolamine (—$CH_2CH_2NH_2$); and serine (—$CH_2CH(NH_2)COOH$), and salts of phospholipids of the Formula (I) (e.g. where $R^3$ is a negative charge or a deprotonated anionic group such as —$CH_2CH(NH_2)COO$—). The hydrogel contact lens of the present invention has been found to sustain the release of oleic acid thereby enhancing the comfort of the contact lens in a lens wearer and/or increasing the duration of comfortable contact lens wearing time in a contact lens wearer.

In one example, the hydrogel contact lens is capable of releasing 0.05 µg to 50 µg, 0.1 µg to 25 µg, 0.5 µg to 10 µg, especially 1 to 5 µg oleic acid after 1 hour following immersion in an in vitro release media comprising ATF containing 50 ppm $sPLA_2$-IIA enzyme solution in phosphate buffered saline (PBS) at 35° C.

Furthermore, the present invention relates to a method of making the hydrogel contact lens of the present invention. The method includes the steps of a) polymerizing a polymerisable composition (as described herein) in a contact lens mold to obtain a polymeric lens body, b) removing the polymeric lens body from the contact lens mold, c) extracting the polymeric lens body in an organic solvent comprising a 2-oleoyl phospholipid, d) hydrating the polymeric lens body in a hydration liquid to obtain the hydrogel contact lens, e) sealing said hydrogel contact lens with packaging solution in a package, and f) autoclaving said package. Hydration step d) may occur prior to extraction step c) in which 2-oleoyl phospholipid is loaded to the polymeric lens body. If hydration step d) occurs prior to extraction step c) in which 2-oleoyl phospholipid is loaded to the polymeric lens body, additional hydration steps may be performed after step c).

Furthermore, the present invention relates to a method of correcting the vision of a symptomatic contact lens wearer by providing to a symptomatic contact lens wearer an oleic acid-releasing hydrogel contact lens comprising a polymeric lens body loaded with a 2-oleoyl phospholipid. Advantageously, the oleic acid-releasing hydrogel contact lens increases the duration of comfortable contact lens wearing time and/or reduces lens awareness events in the symptomatic contact lens wearer compared to a control lens that does not contain 2-oleoyl phospholipid. The 2-oleoyl phospholipid is advantageously susceptible to digestion by $sPLA_2$ enzymes found in human tears especially $sPLA_2$-IIA, when present in the polymeric lens body, such as a 2-oleoyl phospholipid of Formula (I).

Furthermore, the present invention relates to the use of an oleic acid-releasing hydrogel contact lens containing 2-oleoyl phospholipid by a contact lens wearer to increase the duration of comfortable contact lens wearing time and/or reduce lens awareness events compared to a control lens that does not contain 2-oleoyl phospholipid.

Furthermore, the present invention relates to a use of an amount of 2-oleoyl phospholipid to enhance the comfort of a contact lens, wherein the phospholipid is associated with a polymeric lens body of the contact lens.

Furthermore, the present invention relates to a hydrogel composition for use in reducing the sensation of lens awareness in a contact lens wearer, thereby enhancing the comfort of the contact lens in the contact lens wearer and/or increasing the duration of comfortable contact lens wearing time in a contact lens wearer, the composition comprising (a) a polymeric lens body that is a reaction product of a polymerisable composition, loaded with (b) an amount of 2-oleoyl phospholipid.

In all aspects of the invention, the 2-oleoyl phospholipid is advantageously susceptible to digestion by $sPLA_2$ enzymes found in human tears, especially group IIA $sPLA_2$, when the 2-oleoyl phospholipid is present in the polymeric lens body of a silicone hydrogel contact lens. In all aspects of the invention, the contact lens comprising a polymeric lens body loaded with a 2-oleoyl phospholipid may be characterized in that (a) when the contact lens is immersed in a human reflex tears for 4 hours at 35° C. twice, for example three times, the amount of oleic acid is detected in the reflex tear than when the lens is immersed in a release medium lacking phospholipase $A_2$ enzymes for 4 hours at 35° C.; and/or (b) when the contact lens is immersed in an artificial tear fluid (ATF) containing 50 ppm recombinant human group IIa, secretory phospholipase $A_2$ for 4 hours at 35° C. twice, for example three times, the amount of oleic acid is detected in the ATF than when the lens is immersed in an equivalent ATF release medium lacking phospholipase $A_2$ enzymes for 4 hours at 35° C.

Further aspects of the invention are provided in the following numbered clauses:

1. An unworn silicone hydrogel contact lens sealed in a package, the contact lens comprising a polymeric lens body loaded with an amount of a 2-oleoyl phospholipid.
2. The silicone hydrogel contact lens of clause 1, wherein the 2-oleoyl phospholipid is susceptible to digestion by secretory phospholipase $A_2$ ($sPLA_2$) enzymes found in human tears when present in the polymeric lens body.
3. The contact lens of clause 1 or clause 2, wherein the hydrogel contact lens releases oleic acid when in contact with a solution comprising $sPLA_2$-IIA.
4. The silicone hydrogel contact lens of any preceding clause, wherein the contact lens when in contact with an artificial tear serum (ATF) comprising 50 ppm human $sPLA_2$ for four hours at 37° C. releases at least two times more oleic acid than when in contact with ATF without human $sPLA_2$.
5. The silicone hydrogel contact lens of any preceding clause, wherein the 2-oleoyl phospholipid is a phosphatidylserine, a phosphatidylethanolamine, or a phosphatidylglycerol.
6. The silicone hydrogel contact lens of any preceding clause, wherein the 2-oleoyl phospholipid is selected from 1,2-dioleoyl phosphatidylglycerol (DOPG), 1,2-dioleoyl phosphatidylserine (DOPS) and 1,2-dioleoyl phosphatidylethanolamine (DOPE).
7. The silicone hydrogel contact lens of any preceding clause, wherein the polymeric lens body is a reaction product of a polymerisable composition that comprises at least one hydrophilic monomer comprising a vinyl group.
8. The silicone hydrogel contact lens of any preceding clause, wherein the polymeric lens body is a reaction product of a polymerizable composition comprising from 25 wt. % to 55 wt. % of a siloxane monomer, from 30 wt. % to 55 wt. % of a vinyl monomer selected from N-vinyl pyrrolidone, N-vinyl-N-methyl acetamide, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

9. The contact lens of any preceding clause, wherein the polymeric lens body is a reaction product of a polymerisable composition that comprises a first siloxane having the structure represented by Formula (II),

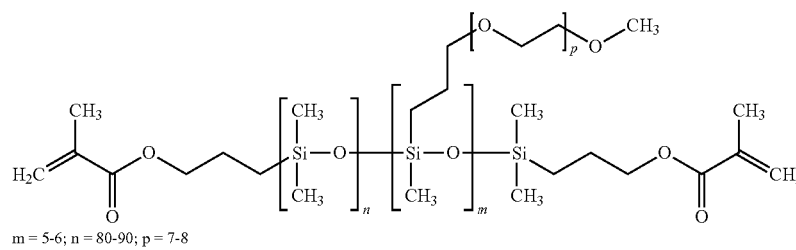

Formula (II)

m = 5-6; n = 80-90; p = 7-8 and a second siloxane having the structure represented by Formula (III),

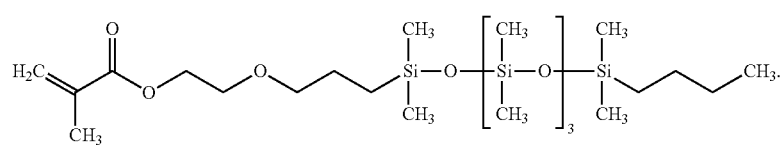

Formula (III)

10. The contact lens of any preceding clause, wherein the polymeric lens body is loaded with at least 10 μg of a 2-oleoyl phospholipid, especially at least 10 μg of 2-oleoyl phosphatidylserine, a 2-oleoyl phosphatidylethanolamine, or a 2-oleoyl phosphatidylglycerol, such as at least 10 μg of 1,2-dioleoyl phosphatidylserine (DOPS), 1,2-dioleoyl phosphatidylethanolamine (DOPE) or 1,2-dioleoyl phosphatidylglycerol (DOPG).

11. The contact lens of clause 10, wherein the amount of 2-oleoyl phospholipid is from 10 μg to 1000 μg, preferably from 25 μg to 250 μg.

12. The contact lens of any preceding clause, wherein when immersed in a release media comprising artificial tear solution containing 50 ppm sPLA$_2$ at 35° C., the contact lens sustains the release of at least 0.1 μg/hr oleic acid for at least 4 hours, such as for at least 8 hours, optionally for at least 10 hours.

13. The contact lens of any preceding clause, wherein the package comprises:

(a) a base member having a cavity that retains a packaging solution and a flange surrounding the cavity; and (b) a cover that forms a liquid-tight seal with the flange of the base member.

14. A method of making the hydrogel contact lens of any preceding clause, the method comprising: a) polymerizing a polymerisable composition in a contact lens mold to obtain the polymeric lens body, b) removing the polymeric lens body from the contact lens mold, c) extracting the polymeric lens body in an organic solvent comprising a 2-oleoyl phospholipid, d) hydrating the polymeric lens body in a hydration liquid to obtain the hydrogel contact lens, e) sealing the hydrogel contact lens with packaging solution in a package and, optionally, f) autoclaving the package.

15. A method for correcting vision of a symptomatic contact lens wearer, said method comprising wearing the hydrogel contact lens of any of clauses 1 to 13 by the symptomatic contact lens wearer.

16. The method of clause 15, wherein the symptomatic contact lens wearer has an increased duration of comfortable contact lens wearing time compared to a control lens.

17. The method of clause 15 or clause 16, wherein the symptomatic contact lens wearer has reduced lens awareness and/or fewer "lens awareness events" during the day compared to a control lens.

18. Use of an amount of a 2-oleoyl phospholipid to enhance the comfort of a contact lens, wherein the phospholipid is associated with a polymeric lens body of the contact lens.

19. The use of clause 18, wherein the contact lens is the hydrogel contact lens of any of clauses 1 to 13.

20. The use of clause 18 or clause 19, wherein the sensation of lens awareness is reduced in a symptomatic contact lens wearer, and/or the duration of comfortable contact lens wearing time is increased.

21. A hydrogel composition for use in reducing the sensation of lens awareness in a contact lens wearer, thereby enhancing the comfort of the contact lens in the contact lens wearer and/or increasing the duration of comfortable contact lens wearing time in a contact lens wearer, the composition comprising (a) a polymeric lens body that is a reaction product of a polymerisable composition, loaded with (b) an amount of a 2-oleoyl phospholipid.

22. The composition for use of clause 21, wherein the composition is in the form of the contact lens of any of clauses 1 to 13.

BRIEF DESCRIPTION OF THE DRAWING

FIG. 1 depicts the enzymatic hydrolysis of dioleoyl phosphatidylglycerol (DOPG) at the sn-2 ester bond by sPLA$_2$ to yield oleic acid and lysophosphatidylglycerol (LOPG).

DETAILED DESCRIPTION

Silicone hydrogel contact lenses that sustain release of oleic acid during wear and their method of manufacture are described herein. The contact lens can be referred to, herein, as an oleic acid-releasing contact lens. Oleic acid is released from the lens during wear in amounts that enhance the comfort of contact lens wear in contact lens wearers, and can increase the duration of time in which a contact lens wearer can comfortably wear contact lenses. In particular, the oleic acid-releasing lens of the invention can increase the end-of-day comfort of lens wear in symptomatic patients.

The silicone hydrogel contact lens of the invention advantageously provides sustained oleic acid release during lens wear. The silicone hydrogel contact lens comprises a polymeric lens body loaded with a glycerophospholipid comprising an oleoyl group (i.e., *OC(O)C$_7$H$_{14}$CH=CHC$_8$H$_{17}$) at the sn-2 position, hereinafter referred to as a "2-oleoyl phospholipid". Any 2-oleoyl phospholipid that is susceptible to degradation by human secretory phospholipase A$_2$ (human sPLA$_2$) present in tears can be used in the contact lens of the invention. A phospholipid's susceptibility to degradation by human sPLA$_2$ present in tears may be determined using commercially available recombinant human PLA2G2A as described in Example 1 below.

The 2-oleoyl phospholipid may, for example, be a phosphatatidic acid, a phosphatididylserine, a phosphatidylethanolamine, a phosphatidylinositol, or a phosphatidylglycerol. Preferably the 2-oleoyl phospholipid is other than a phosphatidylcholine. Phosphatidylcholines have been found to be less susceptible to degradation by the group IIA secretory phospholipase A$_2$ (sPLA$_2$-IIA) enzymes found in human tears than other glycerophospholipids, as demonstrated in Example 1 below. Advantageously, the 2-oleoyl phospholipid is selected from phosphatidylserines, phosphatidylethanolamines, phosphatidylinositols and phosphatidylglycerols, especially phosphatidylethanolamines or phosphatidylglycerols.

By "susceptible to digestion" the sPLA2 present in human tears will hydrolyze the acyl group at the sn2 position of the 2-oleoyl phospholipid resulting in a free fatty acid and a lysophospholipid.

The 2-oleoyl phospholipid is digestible by the human tear. The 2-oleoyl phospholipid is digestible from at least the sPLA2 present in human tears.

The 2-oleoyl phospholipid may comprise another oleoyl group at the sn-1 position, i.e., it may be a dioleoyl phospholipid, for example 1,2-dioleoyl phosphatidylglycerol. Alternatively, the 2-oleoyl phospholipid may comprise a different fatty acid group at the sn-1 position. The fatty acid at the sn-1 position may be a C$_{12-26}$ fatty acid, for example a C$_{14-22}$ fatty acid.

Preferred dioleoyl phospholipids include dioleoyl phosphatidylserine (DOPS), dioleoyl phosphatidylglycerol (DOPG), and dioleoyl phosphatidylethanoamine (DOPE). Other exemplary 2-oleoyl phospholipids include 1-palmitoyl-2-oleoyl phosphatidylethanolamine, 1-palmitoyl-2-oleoyl phosphatidylglycerol, 1-palmitoyl-2-oleoyl phosphatidylserine, 1-myristoyl-2-oleoyl phosphatidylethanolamine, 1-myristoyl-2-oleoyl phosphatidylglycerol, 1-myristoyl-2-oleoyl phosphatidylserine, 1-pentadecanoyl-2-oleoyl phosphatidylethanolamine, 1-pentadecanoyl-2-oleoyl phosphatidylglycerol, 1-pentadecanoyl-2-oleoyl phosphatidylserine, 1-didocosahexaenoyl-2-oleoyl phosphatidylethanolamine, 1-didocosahexaenoyl-2-oleoyl phosphatidylglycerol, 1-didocosahexaenoyl-2-oleoyl phosphatidylserine, 1-stearoyl-2-oleoyl phosphatidylethanolamine, 1-stearoyl-2-oleoyl phosphatidylglycerol, and 1-stearoyl-2-oleoyl phosphatidylserine.

As an option, one or more 2-oleoyl phospholipids as described herein can be present in the oleic acid-releasing contact lens of the present invention (e.g., two different, three different or more 2-oleoyl phospholipids as described herein).

The oleic acid at the sn-2 position is advantageously released and eluted from the lens, while the remainder of the phospholipid (i.e., the lysophospholipid) is retained within the lens. The release rate of the oleic acid may depend on the kinetics of the enzymatic reaction of the 2-oleoyl phospholipid, in addition to the diffusion rate of the oleic acid itself through the contact lens.

The hydrogel contact lens may be a silicone hydrogel. As an example, the silicone hydrogel contact lens comprises a polymeric lens body that is the reaction product of a polymerisable composition comprising at least one siloxane monomer or macromer and at least one hydrophilic monomer and/or at least one hydrophilic polymer. Conveniently, as described in more detail below, a cured polymeric lens body for a silicone hydrogel may be extracted in an extraction solvent, such as ethanol, containing the 2-oleoyl phospholipid. Thus, an extraction step can serve to both extract unreacted monomers and other materials from the cured polymeric lens body and load the 2-oleoyl phospholipid into the polymeric lens body. Alternatively, or in addition to including the 2-oleoyl phospholipid in the extraction solvent, the 2-oleoyl phospholipid may be included in the polymerisable composition. In both cases, the 2-oleoyl phospholipid may become associated with the polymeric lens body by electrostatic and/or hydrophobic interaction and/or may be physically entrapped by the polymer network of the polymeric lens body. Thus, the term "associated with" refers to a non-covalent interaction between the 2-oleoyl phospholipid and the polymeric lens body, and is used interchangeably with the terms "adhered to" and "loaded to".

The amount of 2-oleoyl phospholipid loaded to the polymeric lens body refers to the total amount of phospholipid that can be extracted from the contact lens by an isopropyl alcohol (IPA) extraction method as described in Example 2 below. Advantageously, the 2-oleoyl phospholipid associated with the polymeric lens body is not removed when the lens is immersed in deionized water or a standard contact lens packaging solution, such as phosphate or borate buffered saline. In one example, the 2-oleoyl phospholipid is loaded into the polymeric lens body using a loading solution comprising an alcohol, such as ethanol, and the 2-oleoyl phospholipid is at a concentration ranging from about 0.01 mg/mL to about 10 mg/mL, or from about 0.05 mg/mL to about 5 mg/mL, or from about 0.1 mg/mL to about 2.5 mg/mL. The loading solution may, for example, comprise any mixture of ethanol (EtOH) and water that can solubolize the 2-oleoyl phospholipid and swell the lens material, such as from about 10% to 95% EtOH in water. The lens is immersed in the loading solution for a period of time needed to achieve the desired loading level of the 2-oleoyl phospholipid in the polymeric lens body, which can be determined by routine experimentation such as by following the methods of Example 2. In some examples, the amount of 2-oleoyl phospholipid associated with the polymeric lens body can be at least about 1 µg, 10 µg, 25 µg, 50 µg, or 100 µg, up to about 250 µg, 400 µg, 500 µg, 600 µg, 700 µg, 800 µg, 900 µg or 1000 µg. In one example, the amount of 2-oleoyl phospholipid associated with the polymeric lens body is about 25 µg/lens to about 250 µg/lens.

As used herein, and unless context dictates otherwise, a reference to an amount of oleic acid released from the 2-oleoyl phospholipid-containing contact lens over a specified duration of time or to a "release profile" of the oleic acid, refers to the amount of oleic acid released from the lens as measured using the in vitro release media (the ATF as described in Table 2 below containing 50 ppm sPLA$_2$) and method described in Example 3 below. The contact lens may have an in vitro oleic acid release profile of about 0.05 µg/hr to 50 µg/hr oleic acid from the lens, such as 0.1 µg/hr to 25 µg/hr, or from 0.5 µg/hr to 10 µg/hr, or from 1 µg/hr to 5 µg/hr, following initial immersion into the release media at 35° C. Advantageously, the contact lens sustains the release of oleic acid for at least 4 hours, such as for at least 8 hours, optionally for at least 10 hours or at least 12 hours. Advantageously, the contact lens sustains the release of from 0.05 µg to 25 µg oleic acid, such as 0.1 µg to 10 µg, or from 0.1 µg to 5 µg oleic acid per hour for at least the first 10 hours following immersion in the release media at 35° C. as determined by the method of Example 3. Oleic acid release rates as low as 0.05 µg/hr may be beneficial to some wearers. A release rate above 50 µg/hr may result in irritation in some wearers and some wearers may not experience any additional beneficial effect as the oleic acid release rate increases above 25 µg/hr.

As an option, the contact lens of the present invention does not contain any comfort agents except for the presence of the 2-oleoyl phospholipid as described herein.

As an option, the contact lens of the present invention can contain one or more comfort agents that are different from the 2-oleoyl phospholipid as described herein. The amount of any other comfort agent can be less than the amount of the 2-oleoyl phospholipid present. The amount of any other comfort agent can be less than 300 µg, less than 100 µg, less than 50 µg, less than 10 µg, or less than 1 µg.

As an option, the packaging solution as described herein does not contain any comfort agents.

As an option, the packaging solution as described herein does not contain any comfort agents except for the possible presence of 2-oleoyl phospholipid and/or oleic acid resulting from the 2-oleoyl phospholipid originally present in the contact lens.

As an option, the only phospholipid present in the contact lens or associated with the contact lens is a 2-oleoyl phospholipid.

As an option, the only source of a fatty acid released or present with the contact lens is from the 2-oleoyl phospholipid present.

The present invention has the ability to provide an improved controlled release of oleic acid compared to a free oleic acid being associated with the contact lens (not sourced from a 2-oleoyl phospholipid). For instance, the release can be more linear compared to a free fatty acid being only used/associated with the contact lens.

The release of the fatty acid from the digestion of the 2-oleoyl phospholipid can be considered a tear-controlled release of the fatty acid.

A silicone hydrogel material for contact lenses is typically formed by curing a polymerisable composition (i.e., a monomer mixture) comprising at least one siloxane monomer or macromer and at least one hydrophilic monomer or at least one hydrophilic polymer, or a combination thereof. As used herein, the terms "siloxane monomer" refers to molecules that contains at least one Si—O group and at least one polymerisable functional group. "Siloxane macromers" refers to a silicon-containing molecule with at least one polymerisable functional group which, although used as monomers, possess sufficiently high molecular weight and enough internal monomer units to be considered polymeric. Typically, siloxane macromers contain a siloxane chain with at least 5 siloxane (—Si—O—) units and/or have a molecular weight of at least 500 Daltons.

Siloxane monomers and macromers used in contact lens compositions are well-known in the art (see, e.g., U.S. Pat. Nos. 8,658,747 and 6,867,245). (All patents and publications mentioned here and throughout are incorporated in their entirety by reference.) In some examples, the polymerisable composition comprises a total amount of siloxane monomer or macromer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) of a component of the polymerisable composition is relative to the total weight of all polymerisable ingredients and IPN polymers (as described further below) in the polymerisable composition. The weight of the polymerisable composition contributed by components, such as diluents, that do not incorporate into the final contact lens product are not included in the wt. % calculation.

In a specific example, the polymerisable composition comprises a hydrophilic vinyl monomer. As used-herein, a "hydrophilic vinyl monomer" is any siloxane-free (i.e., contains no Si—O groups) hydrophilic monomer having a polymerisable carbon-carbon double bond (i.e., a vinyl group) present in its molecular structure that is not part of an acryl group, where the carbon-carbon double bond of the vinyl group is less reactive than the carbon-carbon double bond present in a polymerisable methacrylate group under free radical polymerization. As used herein, the term "acryl group" refers to the polymerisable group present in acrylate, methacrylates, acrylamides, etc. Thus, while carbon-carbon double bonds are present in acrylate and methacrylate groups, as used herein, such polymerisable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. In one example, the polymerisable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerisable composition equals the sum of the wt. % of each ingredient in the composition that falls within the class. Thus, for example, a polymerisable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is a vinyl amide monomer. Exemplary hydrophilic vinyl amide monomers are VMA and NVP. In a specific example, the polymerisable composition comprises at least 25 wt. % of a vinyl amide monomer. In a further specific example, the polymerisable composition comprises from about 25 wt. % up to about 75 wt. % of VMA or NVP, or a combination thereof. Additional hydrophilic monomers that may be included in the polymerisable composition are N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof.

In addition, or as an alternative to a hydrophilic monomer, the polymerisable composition may comprise a non-polymerisable hydrophilic polymer, which results in a polymeric lens body comprising an interpenetrating polymer network (IPN) with the non-polymerisable hydrophilic polymer interpenetrating the silicone hydrogel polymer matrix. In this example, the non-polymerisable hydrophilic polymer is referred to as an IPN polymer, which acts as an internal wetting agent in the contact lens. In contrast, polymer chains within the silicone hydrogel network that form by polymerization of monomers present in the polymerisable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerisable composition is substantially free of polyvinyl pyrrolidone or other IPN polymer.

As an option, one or more non-silicon containing hydrophobic monomers can be present as part of the polymerisable composition. A hydrophobic monomer can be understood to be any monomer for which 50 grams of the monomer are not visibly fully soluble in 1 liter of water at 20° C. using a standard shake flask method. Examples of suitable hydrophobic monomers include methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propylmethacrylate, or butyl acrylate, or 2-hydroxybutyl methacrylate, or vinyl acetate, or vinyl propionate, or vinyl butyrate, or vinyl valerate, styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate (IBM), or trifluoroethyl methacrylate, or hexafluoroisopropyl methacrylate, or tetrafluoropropyl methacrylate, or hexafluorobutyl methacrylate, or any combinations thereof.

The hydrophobic monomer, if used, can be present in the reaction product of the polymerisable composition in amounts of from 1 wt. % to about 30 wt. %, such as from 1 wt. % to 25 wt. %, from 1 wt. % to 20 wt. %, from 1 wt. % to 15 wt. %, from 2 wt. % to 20 wt. %, from 3 wt. % to 20 wt. %, from 5 wt. % to 20 wt. %, from 5 wt. % to 15 wt. %, from 1 wt. % to 10 wt. %, based on the total weight of the polymerisable composition.

The polymerisable composition may additionally comprise at least one cross-linking agent. As used herein, a "cross-linking agent" is a molecule having at least two polymerisable groups. Thus, a cross-linking agent can react with functional groups on two or more polymer chains so as to bridge one polymer to another. The cross-linking agent may comprise an acryl group or a vinyl group, or both an acryl group and a vinyl group. In certain examples, the cross-linking agent is free of siloxane moieties, i.e., it is a non-siloxane cross-linking agent. A variety of cross-linking agents suitable for use in silicone hydrogel polymerisable compositions are known in the field (see, e.g., U.S. Pat. No. 8,231,218, incorporated herein by reference). Examples of suitable cross-linking agents include, without limitation, lower alkylene glycol di(meth)acrylates such as triethylene glycol dimethacrylate, diethylene glycol dimethacrylate, poly(lower alkylene) glycol di(meth)acrylates and lower alkylene di(meth)acrylates; divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth)acrylate; methylenebis(meth)acrylamide; triallyl phthalate; 1,3-bis(3-methacryloxypropyl)tetramethyldisiloxane; diallyl phthalate; and combinations thereof.

As will be appreciated by those skilled in the art, the polymerisable composition may comprise additional polymerisable or non-polymerisable ingredients conventionally used in contact lens formulations such as one or more of a polymerization initiator, a UV absorbing agent, a tinting agent, an oxygen scavenger, a chain transfer agent, or the like. In some examples, the polymerisable composition may include an organic diluent in an amount to prevent or minimize phase separation between the hydrophilic and hydrophobic components of the polymerisable composition, so that an optically clear lens is obtained. Diluents commonly used in contact lens formulations include hexanol, ethanol, and/or other primary, secondary or tertiary alcohols. In other examples, the polymerisable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerisable composition. Non-limiting examples of these and additional ingredients that may be included in the polymerisable composition are provided in U.S. Pat. No. 8,231,218.

Non-limiting examples of silicone hydrogels that may be used include comfilcon A, fanfilcon A, stenfilcon A, senofilcon A, senofilcon C. somofilcon A, narafilcon A, delefilcon A, narafilcon A, lotrafilcon A, lotrafilcon B, balafilcon A, samfilcon A, galyfilcon A, and asmofilcon A.

A specific example of a hydrogel contact lens of the present invention is one that is based on a polymerisable composition comprising from 25 wt. % to 55 wt. % of siloxane monomer(s) or macromer(s), from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof. Silicone hydrogel materials made from this specific embodiment of polymerisable composition include stenfilcon A, comfilcon A, somofilcon A, fanfilcon A, and enfilcon A. In a further example, the above-described polymerizable composition comprises the siloxanes of stenfilcon A, specifically a first siloxane having the structure represented by Formula (II), Formula (II)

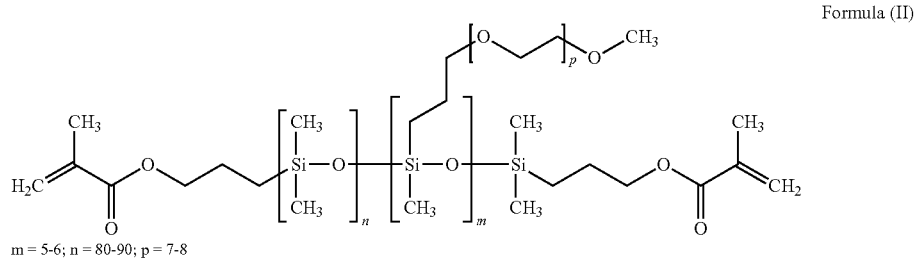

m = 5-6; n = 80-90; p = 7-8 and a second siloxane having the structure represented by Formula (III),

Formula (III)

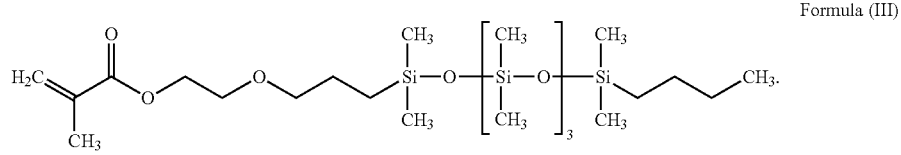

Conventional methods can be used to manufacture the contact lens of the invention. As an example, a polymerisable composition for a hydrogel composition is dispensed into a female mold member having a concave surface that defines the front surface of the contact lens. A male mold member having a convex surface that defines the back surface of the contact lens, i.e., the cornea-contacting surface, is combined with the female mold member to form a contact lens mold assembly that is subjected to curing conditions, such as UV or thermal curing conditions, under which the curable composition is formed into a polymeric lens body. The female and male mold members can be non-polar molds or polar molds. The mold assembly is disassembled (i.e., demolded) and the polymeric lens body is removed from the mold and contacted with a solvent, for instance, an organic solvent, such as ethanol, to extract unreacted components from the lens body. After extraction, the lens body is hydrated in one or more hydration liquids such as water or an aqueous solution and packaged. Exemplary methods of manufacturing silicone hydrogel contact lenses are described in U.S. Pat. No. 8,865,789.

The 2-oleoyl phospholipid is typically loaded into the polymeric lens during the extraction step. Generally, after curing, the polymeric lens body is swelled in an extraction solvent, such as a mixture of ethanol and water that contains the 2-oleoyl phospholipid. When the extracted polymeric lens body is subsequently placed in a hydration solution, such as deionized (DI) water, the extraction solvent is removed, and the 2-oleoyl phospholipid remains associated with the polymeric lens body.

Examples of the extraction solvents and hydration liquids used in an extraction and hydration process can consist of denatured ethanol, a mixture of denatured ethanol and deionized water, and deionized water. As an example, the extraction and hydration process can involve at least one extraction step in denatured ethanol (EtOH) followed by an extraction step comprising a mixture of EtOH and water, such as from about 10% to 95% EtOH in water, for example from about 30% to 80% EtOH in water, followed by at least one hydration step in deionized water, and wherein each extraction and hydration step can last from about 15 minutes to about 3 hours at a temperature of from about 20° C. and to about 30° C. An extraction solvent can contain the 2-oleoyl phospholipid to achieve uploading of the 2-oleoyl phospholipid to the polymeric lens body.

Any extraction solvent used as an uploading solution for the 2-oleoyl phospholipid can contain a concentration of 2-oleoyl phospholipid of about 0.01 µg/ml to 10 mg/mL, such as from 0.1 µg/ml to 5 mg/mL. The amount of 2-oleoyl phospholipid loaded to the polymeric lens body can be from 10 µg to 1000 µg, such as from about 25 µg to 500 µg, or from 50 µg to 250 µg.

As part of the present invention, the contact lens can be sealed in a contact lens package. The packaging solution sealed within the contact lens package may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other beneficial agent. In some examples, the packaging solution may comprise polysaccharides (e.g., hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions. In other examples, the packaging solution may comprise an ophthalmic drug. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg.

With respect to the contact lens package, this package can include or comprise a plastic base member comprising a cavity configured to retain the contact lens and packaging solution and a flange region extending outwardly around the cavity. A removable foil is attached to the flange region to provide a sealed contact lens package. Such contact lens packages, which are commonly referred to as "blister packs", are well-known in the art (see e.g., U.S. Pat. No. 7,426,993).

It will be appreciated that conventional manufacturing methods can be used to manufacture the sealed contact lens package. In a method of manufacturing a contact lens package, the method can include the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic. In one example, the receptacle comprises a plastic base member comprising a cavity configured to retain the contact lens and packaging solution and a flange region extending outwardly around the cavity, and the cover comprises a removable foil attached to the flange region to provide the sealed contact lens package. The removable foil may be sealed by any conventional means such as heat sealing or gluing. In another example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit. The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes.

The contact lens can be provided unworn (i.e., a new contact lens, not having been previously used by a patient), immersed in the packaging solution and sealed in a package. The package may be a blister package, glass vial, or other appropriate container. The package may comprise a base member having a cavity that retains a packaging solution, a cover that forms a liquid-tight seal with the base member and an unworn contact lens. The sealed package may be sterilized by sterilizing amounts of radiation, including heat or steam, such as by autoclaving, or by gamma radiation, e-beam radiation, ultraviolet radiation, etc.

In a specific example, the packaged contact lens is sterilized by autoclaving.

The final product can be a sterile, packaged contact lens (e.g., silicone hydrogel contact lens) having ophthalmically-acceptable surface wettability.

The oleic acid-releasing hydrogel contact lens described herein can be used to correct vision of a symptomatic contact lens wearer. For example, the oleic acid-releasing hydrogel contact lens contact lens of the invention can increase the duration of comfortable contact lens wearing time in a symptomatic contact lens wearer. References herein to a "symptomatic contact lens wearer" or "symptomatic subject" refers to a lens wearer that is classified as symptomatic using the CLDEQ-8 as described by Chalmers et al (see Chalmers et al., *Contact Lens Dry Eye Questionnaire-8 (CLDEQ-8) and opinion of contact lens performance.* Optom Vis Sci 2012; 89 (10): 1435-1442).

The oleic acid-releasing hydrogel contact lens described herein can be worn by a contact lens wearer to reduced lens awareness and/or result in fewer "lens awareness events" during the day compared to a control lens or the contact lens wearer's habitual lenses. References herein to a "control lens" refer to a contact lens that contains no phospholipid or oleic acid but is otherwise identical to the oleic acid-releasing lens to which it is being compared. A reduction in lens awareness and/or lens awareness events during contact lens wear can be determined using a "lens awareness logger" as described by Read et al. (see Read et al., *Monitoring ocular discomfort using a wrist-mounted electronic logger.* Contact Lens and Anterior Eye Vol. 43 (2020) 476-483.

The following Examples illustrate certain aspects and advantages of the present invention, which should be understood not to be limited thereby.

Example 1. Oleic Acid Release from Stenfilcon A Lenses Loaded with Different 2-Oleoyl Phospholipids The phospholipids shown in Table 1 were obtain from Avanti Polar Lipids. 3 mg/ml loading solutions of the phospholipids shown in Table 1 were prepared by adding 2.4 mL ethanol to 9 mg of phospholipid, sonicating (up to 15 minutes) then adding 0.6 mL DI water and sonicating again (up to 15 minutes) to dissolve the phospholipid.

TABLE 1

| Phospholipid | Abbreviation | Cat. No. |
|---|---|---|
| 1,2-dioleoyl-sn-glycero-3-phospho-L-serine (sodium salt) | DOPS | 840035P |
| 1,2-dioleoyl-sn-glycero-3-phospho-(1'-rac-glycerol) (sodium salt) | DOPG | 840475P |
| 1,2-dioleoyl-sn-glycero-3-phosphocholine | DOPC | 850375P |
| 1,2-dioleoyl-sn-glycero-3-phosphoethanolamine | DOPE | 850725P |

Hydrated contact lenses made from stenfilcon A were washed three times in 3 mL purified water for 30 minutes each time. Each washed lens was placed in 3 mL of a phospholipid loading solution and incubated at room temperature with gentle shaking at 75 rpm for 3 hours. The loaded lenses were then rinsed and hydrated in several exchanges of DI water. The lenses were packaged in a buffered saline contact lens packaging solution and autoclaved.

An artificial tear fluid (ATF) was prepared by adding the first three ingredients listed in Table 2 to a clean class vial and then adding 30 mL of the fourth ingredient.

TABLE 2

| Ingredient | Vendor | Cat. No. | Amount | Concentration (mg/ml) |
|---|---|---|---|---|
| Bovine Serum Albumin (fatty acid-free) | Akron Biotech | AK8909 | 60 mg | 2.0 |
| Lysozyme | Sigma Aldrich | L6876 | 57 mg | 1.9 |
| Mucin | Sigma Aldrich | MJ3895 | 4.5 mg | 0.15 |
| Dulbecco's PBS (DPBS) | Sigma Aldrich | 850725P | 30 ml | |

After autoclave each lens was removed from its package and place in a 6 mL glass vial containing 5 mL of the ATF at room temperature on a shaker at 125 rpm overnight to elute any free oleic acid that may be present in the lens.

Each lens was rinsed in a 6 ml glass vial containing a fresh aliquot of 5 mL ATF for 30 minutes prior to running the digestion assay.

A 50 ppm solution of sPLA$_2$ was prepared in ATF by adding 200 µl ATF to a tube containing 10 µg recombinant human PLA2G2A (Creative BioMart, Cat. No. PLA2G2A-669H). The solution is referred to as ATF+sPLA2. Two 4 mm pieces were cut from each lens. One piece of each lens was placed in a tube with 100 µL ATF and the other piece was placed in a tube containing 100 µL ATF+sPLA2. The tubes were incubated at 35±2° C. for 4 hours with no shaking.

50 µl of the release media from each lens at T=4 hr was transferred to HPLC vials and 500 µl isopropanol (IPA) was added and mixed well. T=0 hr HPLC vials were also prepared (50 µl ATF+500 µl IPA). All vials were sonicated for 15 minutes and centrifuged. The supernatant was removed for LCMS injection.

The supernatants were injected on an LCMS instrument equipped with an ACQUITY UPLC BEH C18 1.7 µg, 2.1 mm×15 cm column and running a mobile phase gradient from 65% A to 90% B at a flow rate of 0.35 mL/min with A=40% acetonitrile in water with 10 mM ammonium acetate and 0.2% (v/v) ammonium hydroxide, and B=10% acetonitrile in IPA with 10 mM ammonium acetate and 0.2% (v/v) ammonium hydroxide. The mass spec detector is run at negative electrospray mode. The peaks for oleic acid (OA) in the supernatants were measured (m/z trace=281.24). The ratio of OA peak area in ATF with and without sPLA2 was calculated. The results are shown in Table 3.

TABLE 3

Oleic acid peak areas in ATF with and without sPLA2.

| Sample | ATF | ATF + sPLA2 | Ratio |
|--------|-----|-------------|-------|
| DOPG | 36 | 9958 | 279 |
| DOPE | 463 | 2127 | 4.6 |
| DOPC | 102 | 125 | 1.2 |
| DOPS | 88 | 1437 | 16.4 |

The results suggest that contact lenses loaded with 2-oleoyl phosphatidylcholines are not susceptible to sPLA2-mediated degradation and fatty acid release whereas contact lenses loaded with phosphatidylglycerols, phosphatidylethanolamines, and phosphatidylserines are susceptible to sPLA2-mediated fatty acid release.

Example 2. DOPG-Loaded Stenfilcon A Contact Lenses 1,2-Dioleoyl-sn-glycero-3-phospho-rac-(1-glycerol) sodium salt (DOPG) from Sigma-Aldrich was dissolved into a 50% by volume ethanol (EtOH) 50% by volume deionized water solution and sonicated until the DOPG was fully dissolved to provide DOPG loading solutions ranging in concentration from 1 mg/ml to 10 mg/ml.

Silicone hydrogel contact lenses were prepared by curing the formulation for stenfilcon A in polypropylene contact lens molds. The cured stenfilcon A was removed from the molds, and each lens was extracted in EtOH to remove unreacted monomer. The lenses were then placed in the DOPG loading solutions for about 90 minutes and then hydrated in several exchanges of DI water. The lenses were packaged in plastic blisters with about 1.2 ml of a packaging solution comprising phosphate buffered saline (PBS) and autoclaved.

The amount of DOPG in each lens was determined by extracting the lens with isopropanol (IPA) and measuring DOPG in the extract by LCMS. Briefly, each lens was removed from its blister pack, lightly blotted to remove excess packaging solution, and placed in a 20 mL glass vial containing 10 mL 100% IPA. The vials were placed on a bench top shaker at 300 rpm overnight (~16 hours) at room temperature. For stenfilcon A, a single 2 hours extraction step is sufficient to extract substantially all the DOPG from the lense. Silicone hydrogel lens materials that are more hydrophobic may require a second overnight extraction in order to extract all the DOPG, in which case the IPA from the first extraction step is removed and replaced with 3 mL fresh IPA and shaken overnight at 300 rpm at room temperature. The amount of DOPG in the IPA extract from each lens is determined by LCMS compared to a DOPG standard solution. The DOPG loading concentrations and average DOPG in each lens are shown in Table 4.

TABLE 4

| DOPG loading concentration | Average amount of DOPG/lens |
|---|---|
| 1.0 mg/mL | 240 µg |
| 2.5 mg/mL | 495 µg |
| 5.0 mg/mL | 760 µg |
| 7.5 mg/ml | 895 µg |
| 10.0 mg/ml | 975 µg |

Example 3. Determining Oleic Acid Release Profiles

To determine the oleic acid release profile of a silicone hydrogel contact lens loaded with a 2-oleoyl phospholipid, the lens is removed from its package and placed in a 6 mL glass vial containing 5 mL of ATF (described in Example 1) at room temperature on a shaker at 125 rpm overnight to elute any free oleic acid that may be present in the lens.

Each lens is then transferred to a 6 mL glass vial containing 3 mL of the in vitro release media comprising ATF comprising 50 ppm recombinant human PLA2G2A at 35° C. As an alternative, phospholipase A$_2$ from honeybee venom (CAS No. 9001-84-7) may be used instead in place of the recombinant human PLA2G2A at the same concentration (50 ppm). The vials are placed on a shaker at 50 rpm in a 35° C. incubator, and at 2-hour increments (e.g., 2 hr, 4 hr, 6 hr, 8 hr and 10 hr) 2.5 ml of the in vitro release media is removed from each vial and submitted for analysis. If the release media is not to be analysed right away at that specific time point, a sample is taken and mixed with IPA (1:10 v/v ratio) to stop enzymatic activity. Following that, 2.5 ml of fresh in vitro release media comprising ATF comprising 50 ppm recombinant human PLA2G2A is added back to each vial and the lens is continued to be incubated. At the end of the release experiment, the amount of OA in the release media at each timepoint is analysed by LCMS using the method described in Example 1.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

References herein to "an example" or "a specific example" or "an aspect" or "an embodiment" or similar phrase, are intended to introduce a feature or features of the oleic acid-releasing hydrogel contact lens of the invention or components thereof, the sealed contact lens package or components thereof, or method of manufacturing the oleic acid-releasing hydrogel contact lens of the invention (depending on context) that can be combined with any combination of previously-described or subsequently-described examples, aspects, embodiments (i.e. features), unless a particular combination of features is mutually exclusive, or if context indicates otherwise. Further, as used in this specification, the singular forms "a," "an," and "the" include plural referents (e.g., at least one or more) unless the context clearly dictates otherwise. Thus, for example, reference to a "contact lens" includes a single lens as well as two or more of the same or different lenses.

The entire contents of all cited references in this disclosure, to the extent that they are not inconsistent with the present disclosure, are incorporated herein by reference.

The present invention can include any combination of the various features or embodiments described above including the above numbered clauses and/or in the claims below as set forth in sentences and/or paragraphs. Any combination of disclosed features herein is considered part of the present invention and no limitation is intended with respect to combinable features.

4. The silicone hydrogel contact lens of claim 1, wherein the polymeric lens body is a reaction product of a polymerizable composition comprising from 25 wt. % to 55 wt. % of a siloxane monomer, from 30 wt. % to 55 wt. % of a vinyl monomer selected from N-vinyl pyrrolidone, N-vinyl-N-methyl acetamide, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

5. The silicone hydrogel contact lens of claim 1, wherein the polymeric lens body is a reaction product of a polymerisable composition that comprises a first siloxane having the structure represented by Formula (II),

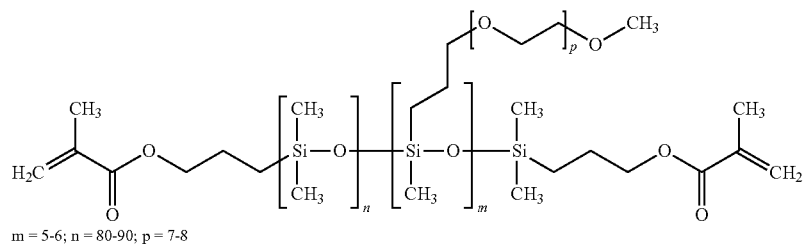

Formula (II)

m = 5-6; n = 80-90; p = 7-8

Other embodiments of the present invention will be apparent to those skilled in the art from consideration of the and a second siloxane having the structure represented by Formula (III),

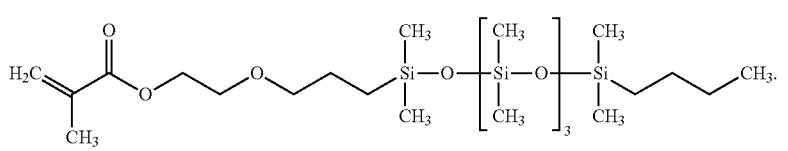

Formula (III)

present specification and practice of the present invention disclosed herein. It is intended that the present specification and examples be considered as exemplary only with a true scope and spirit of the invention being indicated by the following claims and equivalents thereof.

What is claimed is:

1. An unworn silicone hydrogel contact lens sealed in a package, the contact lens comprising a polymeric lens body loaded with at least one 2-oleoyl phospholipid, wherein the contact lens when in contact with an artificial tear serum (ATF) comprising 50 ppm human sPLA$_2$ for four hours at 37° C. releases at least two times more oleic acid than when in contact with ATF without human sPLA$_2$.

2. The silicone hydrogel contact lens of claim 1, wherein the 2-oleoyl phospholipid is a phosphatidylserine, a phosphatidylethanolamine or a phosphatidylglycerol.

3. The silicone hydrogel contact lens of claim 1, wherein the 2-oleoyl phospholipid is selected from DOPG, DOPS and DOPE.

6. The silicone hydrogel contact lens of claim 1 loaded with from 10 μg to 1000 μg, preferably from 25 μg to 250 μg of the 2-oleoyl phospholipid.

7. The silicone hydrogel contact lens of claim 1, wherein when immersed in a release media comprising artificial tear solution containing 50 ppm sPLA$_2$ at 35° C., the contact lens sustains the release of at least 0.1 μg/hr oleic acid for at least 4 hours, such as for at least 8 hours, optionally for at least 10 hours.

8. An unworn silicone hydrogel contact lens sealed in a package, the contact lens comprising a polymeric lens body loaded with at least 10 μg of a 2-oleoyl phospholipid, wherein the 2-oleoyl phospholipid is a phosphatidylserine, a phosphatidylethanolamine, a phosphatidylinositol, or a phosphatidylglycerol.

9. The silicone hydrogel contact lens of claim 8, wherein the 2-oleoyl phospholipid is selected from DOPG, DOPS and DOPE.

10. The silicone hydrogel contact lens of claim 8, wherein the polymeric lens body is a reaction product of a polymerizable composition comprising from 25 wt. % to 55 wt. % of a siloxane monomer, from 30 wt. % to 55 wt. % of a vinyl monomer selected from N-vinyl pyrrolidone, N-vinyl-N-methyl acetamide, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

11. The contact lens of claim 8, wherein the polymeric lens body is a reaction product of a polymerisable composition that comprises a first siloxane having the structure represented by Formula (II),

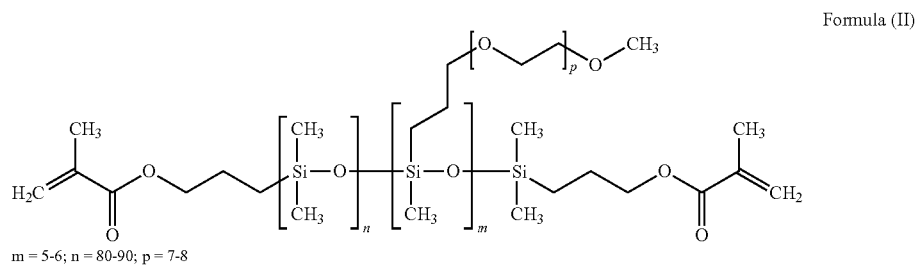

Formula (II)

$m = 5\text{-}6; n = 80\text{-}90; p = 7\text{-}8$ and a second siloxane having the structure represented by Formula (II),

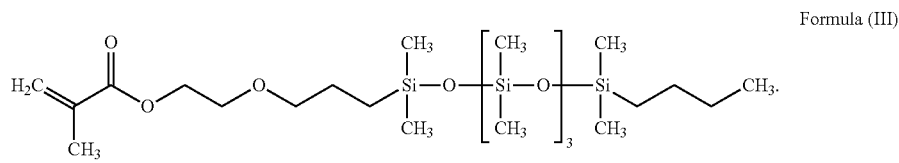

Formula (III)

12. The contact lens of claim 8 loaded with from 10 μg to 1000 μg, preferably from 25 μg to 250 μg of the 2-oleoyl phospholipid.

13. The contact lens of claim 8, wherein when immersed in a release media comprising artificial tear solution containing 50 ppm $sPLA_2$ at 35° C., the contact lens sustains the release of at least 0.1 μg/hr oleic acid for at least 4 hours, such as for at least 8 hours, optionally for at least 10 hours.

* * * * *